United States Patent
Whittle et al.

(10) Patent No.: US 11,008,880 B2
(45) Date of Patent: May 18, 2021

(54) TURBINE SECTION ASSEMBLY WITH CERAMIC MATRIX COMPOSITE VANE

(71) Applicant: Rolls-Royce plc, London (GB)

(72) Inventors: Michael J. Whittle, London (GB); Anthony G. Razzell, London (GB); Roderick M. Townes, London (GB); David J. Shepherd, London (GB); Duncan Forbes, London (GB)

(73) Assignee: Rolls-Royce plc

( * ) Notice: Subject to any disclaimer, the term of this patent is extended or adjusted under 35 U.S.C. 154(b) by 314 days.

(21) Appl. No.: 16/391,911

(22) Filed: Apr. 23, 2019

(65) Prior Publication Data
US 2020/0340367 A1    Oct. 29, 2020

(51) Int. Cl.
*F01D 9/04* (2006.01)

(52) U.S. Cl.
CPC .......... *F01D 9/042* (2013.01); *F05D 2240/12* (2013.01); *F05D 2240/80* (2013.01); *F05D 2260/31* (2013.01); *F05D 2300/6033* (2013.01)

(58) Field of Classification Search
CPC ... F01D 9/00; F01D 9/04; F01D 9/041; F01D 9/042; F01D 9/044; F01D 5/28; F01D 5/282; F01D 5/284; F01D 25/24; F05D 2240/12; F05D 2240/80; F05D 2300/603; F05D 2300/6033; F05D 2260/31
See application file for complete search history.

(56) References Cited

U.S. PATENT DOCUMENTS

| | | |
|---|---|---|
| 2,497,041 A * | 2/1950 | Bodger .................. F01D 5/284 415/209.4 |
| 4,979,872 A * | 12/1990 | Myers ..................... F01D 9/065 403/131 |
| 5,078,576 A | 1/1992 | Hayton |
| 6,325,593 B1 | 12/2001 | Darkins, Jr. et al. |
| 6,514,046 B1 | 2/2003 | Morrison et al. |
| 6,558,114 B1 | 5/2003 | Tapley et al. |
| 6,648,597 B1 | 11/2003 | Widrig et al. |
| 6,860,716 B2 | 3/2005 | Czachor et al. |
| 6,884,030 B2 | 4/2005 | Darkins, Jr. et al. |
| 7,588,414 B2 | 9/2009 | Wunderlich et al. |
| 7,762,766 B2 | 7/2010 | Shteyman et al. |
| 8,371,127 B2 | 2/2013 | Durocher et al. |
| 8,454,303 B2 | 6/2013 | Garcia-Crespo |
| 9,097,141 B2 | 8/2015 | Paradis |
| 9,546,557 B2 | 1/2017 | Grooms, III et al. |

(Continued)

FOREIGN PATENT DOCUMENTS

| | | |
|---|---|---|
| EP | 3121379 A1 | 1/2017 |
| EP | 3597866 A1 | 1/2020 |

OTHER PUBLICATIONS

Extended European Search Report, European Application No. 20165662.6—1004, dated Sep. 21, 2020, 8 pages.

*Primary Examiner* — Christopher Verdier
*Assistant Examiner* — Elton K Wong
(74) *Attorney, Agent, or Firm* — Barnes & Thornburg LLP

(57) ABSTRACT

A turbine assembly adapted for use in a gas turbine engine is disclosed in this paper. The turbine assembly includes a turbine vane comprising ceramic matrix composite materials configured for use in high temperature environments. The turbine assembly further includes a vane-stage support for holding the turbine vane and other components in place relative to a turbine case.

18 Claims, 5 Drawing Sheets

(56) References Cited

U.S. PATENT DOCUMENTS

| | | |
|---|---|---|
| 9,890,663 B2 | 2/2018 | Scott |
| 9,915,159 B2 | 3/2018 | Huizenga et al. |
| 9,970,317 B2 | 5/2018 | Freeman et al. |
| 10,054,009 B2 | 8/2018 | Scott |
| 10,174,627 B2 | 1/2019 | Chang et al. |
| 2004/0253096 A1 | 12/2004 | Legg |
| 2013/0094951 A1* | 4/2013 | McCaffrey ............ F01D 25/246 415/200 |
| 2014/0234118 A1 | 8/2014 | Beaujard et al. |
| 2014/0255174 A1 | 9/2014 | Duelm et al. |
| 2016/0123163 A1 | 5/2016 | Freeman et al. |
| 2016/0123164 A1 | 5/2016 | Freeman et al. |
| 2016/0177761 A1 | 6/2016 | Huizenga et al. |
| 2016/0201488 A1 | 7/2016 | Carr et al. |
| 2017/0022833 A1 | 1/2017 | Heitman et al. |
| 2017/0051619 A1 | 2/2017 | Tuertscher |
| 2018/0045117 A1 | 2/2018 | Groves, II et al. |
| 2018/0202302 A1 | 7/2018 | Quennehen et al. |
| 2018/0223680 A1 | 8/2018 | Hafner |
| 2018/0238181 A1 | 8/2018 | Reynolds et al. |
| 2018/0238184 A1 | 8/2018 | Reynolds et al. |
| 2018/0328187 A1* | 11/2018 | Oke ........................ F01D 9/065 |
| 2018/0340431 A1 | 11/2018 | Kerns et al. |
| 2018/0370158 A1 | 12/2018 | Gallier et al. |

\* cited by examiner

TURBINE SECTION ASSEMBLY WITH CERAMIC MATRIX COMPOSITE VANE

FIELD OF THE DISCLOSURE

The present disclosure relates generally to gas turbine engines, and more specifically to turbine sections of such engines—especially those with ceramic matrix composite vanes.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Products of the combustion reaction directed into the turbine flow over airfoils included in stationary vanes and rotating blades of the turbine. The interaction of combustion products with the airfoils heats the airfoils to temperatures that require the airfoils to be made from high-temperature resistant materials and/or to be actively cooled by supplying relatively cool air to the vanes and blades. To this end, some airfoils for vanes and blades are incorporating composite materials adapted to withstand very high temperatures. Design and manufacture of vanes and blades from composite materials presents challenges because of the geometry and strength required for the parts.

SUMMARY

The present disclosure may comprise one or more of the following features and combinations thereof.

A turbine assembly adapted for use in a gas turbine engine with a turbine vane comprising ceramic matrix composite materials configured to redirect air moving through a primary gas path of the gas turbine engine may include a turbine case, a vane stage, and a vane-stage support. The turbine case may be arranged around a central reference axis.

In some embodiments, the vane stage may include the turbine vane comprising ceramic matrix composite materials and an inner vane seal land. The turbine vane may be shaped to form an airfoil that extends across the primary gas path of the gas turbine engine. The inner vane seal land may be located radially inward of the turbine vane. The inner vane seal land may be configured to be engaged by a rotating component to create a seal separating pressure zones within the gas turbine engine when the turbine assembly is used in the gas turbine engine.

In some embodiments, the vane-stage support may comprise metallic materials and may be configured to hold the turbine vane and the inner vane seal land in place relative to the turbine case. The vane-stage support may include a case mount and a spar. The case mount may extend radially through the case. The spar may extend from the case mount radially through the airfoil of the turbine vane to the inner vane seal land. In some embodiments, the turbine vane and the inner vane seal land may be coupled to the spar so that forces applied to the vane stage are carried by the spar to the case mount and case during use of the turbine assembly in the gas turbine engine.

In some embodiments, the case mount may include a coupling flange. The coupling flange may extend along a radially-outwardly facing surface of the case.

In some embodiments, the coupling flange may include a spar fixture. The spar fixture may extend radially-inwardly from the coupling flange through a mount aperture formed in the case. In some embodiments, the spar may be coupled to the spar fixture inside the case.

In some embodiments, the spar fixture may define a radially-inwardly opening spar-receiver space inside the case. In some embodiments, the spar may be arranged in part within the spar-receiver space.

In some embodiments, the spar fixture may include at least two retainer legs. The retainer legs may be arranged on opposed sides of the spar and may clamp onto the spar to couple the spar to the case mount.

In some embodiments, the case mount may include a threaded fixture fastener. The threaded fixture fastener may applies a clamp load onto the at least two retainer legs of the spar fixture to clamp the spar therebetween.

In some embodiments, the coupling flange may include a forward portion and an aft portion. The forward portion may extends axially forward of the mount aperture. The aft portion may extend axially aft of the mount aperture.

In some embodiments, the vane-stage support may include threaded flange fasteners. The threaded flange fasteners may be located forward and aft of the mount aperture and may secure the forward portion and the aft portion of the coupling flange to the case.

In some embodiments, the spar fixture of the vane-stage support may be engaged directly by the turbine vane of the vane stage so that forces applied to the turbine vane are carried by the case mount to the case during use of the turbine assembly in the gas turbine engine.

In some embodiments, the spar fixture may include an outer load transfer collar. The outer load transfer collar may extend around the spar and engage directly with an interior side of the airfoil formed by the turbine vane so that forces applied to the turbine vane are carried by the case mount to the case during use of the turbine assembly in the gas turbine engine.

According to another aspect of the disclosure, a turbine assembly adapted for use in a gas turbine engine may include a turbine case, a turbine vane, an inner vane seal, and a vane-stage support. The turbine case may be arranged around a reference central axis. The turbine vane may comprise ceramic matrix composite materials and may be shaped to form an airfoil. The inner vane seal land may be located radially inward of the turbine vane. The vane-stage support may be configured to hold the turbine vane and the inner vane seal land in place relative to the turbine case, In some embodiments, the vane-stage support may include a case mount and a spar. The case mount may extend radially through the case. The spar may extend from the case mount radially through the airfoil of the turbine vane to the inner vane seal land.

In some embodiments, the inner vane seal land may be coupled to the spar so that forces applied to the inner vane seal land are carried by the spar to the case mount and case during use of the turbine assembly in the gas turbine engine. In some embodiments, the inner vane seal land may be fixed to the spar at a location radially inward of the turbine vane.

In some embodiments, the case mount may include a coupling flange and a spar fixture. The coupling flange may be engaged with the case. The spar fixture may extend radially through a mount aperture in the case to the spar. In some embodiments, the coupling flange of the case mount may extend in direct confronting relation along a radially-outwardly facing surface of the case.

In some embodiments, the vane-stage support may include threaded flange fasteners. The threaded flange fasteners may be located axially forward and aft of the mount aperture and may extend through the coupling flange to fix the case mount to the case.

In some embodiments, the spar fixture may define a radially-inwardly opening spar-receiver space inside the case. In some embodiments, the spar may be arranged in part within the spar-receiver space.

In some embodiments, the spar fixture may include at least two retainer legs. The at least two retainer legs may be arranged on opposed sides of the spar and may clamp onto the spar to couple the spar to the case mount.

In some embodiments, the case mount may include a threaded fixture fastener. The threaded fixture fasteners may apply a clamp load onto the at least two retainer legs of the spar fixture to clamp the spar therebetween.

In some embodiments, the spar may include a rod and an inner load transfer collar. The rod may be received in part in spar fixture to couple the spar to the case mount and may extend from the spar fixture through the airfoil of the turbine vane to the inner vane seal land. The inner load transfer collar may extend axially forward and aft from the rod to directly engage the turbine vane at a radially-inner end of the vane. In some embodiments, the spar fixture of the vane-stage support may be engaged directly by the turbine vane at a radially-outer end of the vane.

These and other features of the present disclosure will become more apparent from the following description of the illustrative embodiments.

DETAILED DESCRIPTION OF THE DRAWINGS

Figure 1:
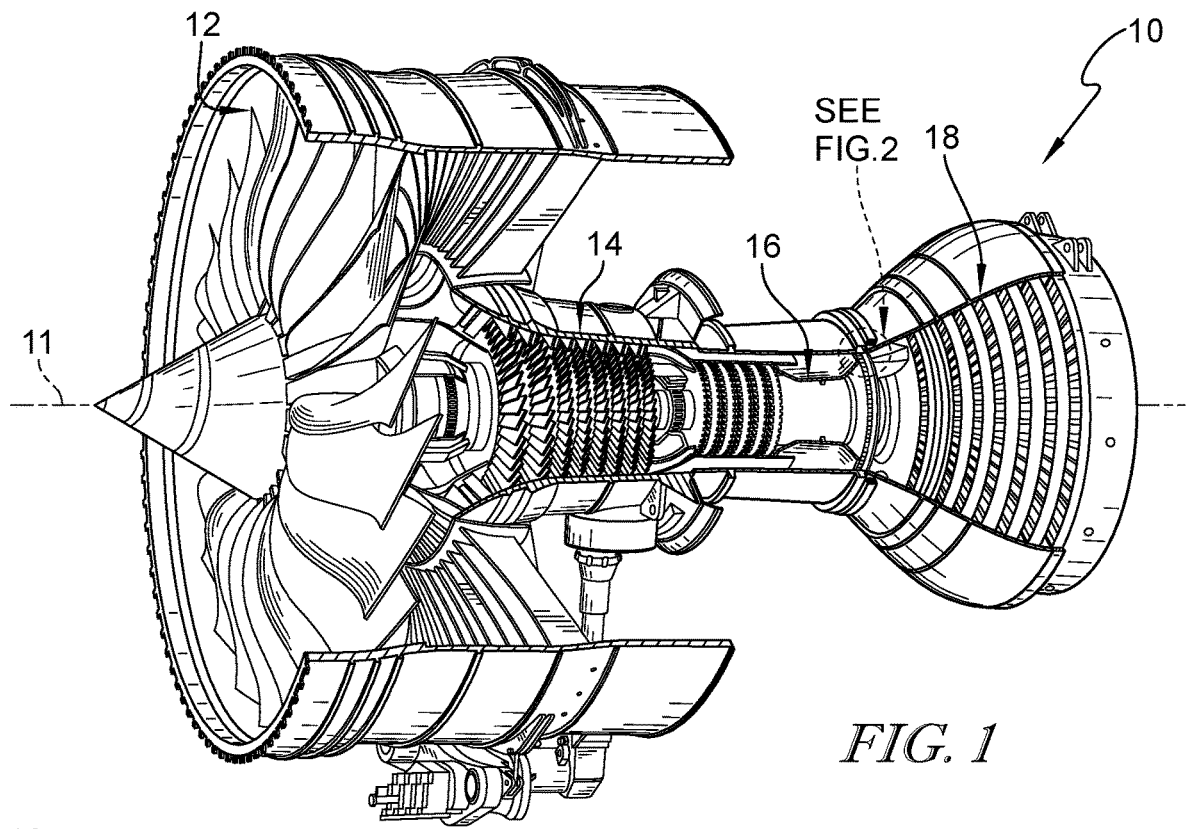
FIG. 1 is a cutaway view of a gas turbine engine that includes a fan, a compressor, a combustor, and a turbine assembly in accordance with the present disclosure that is adapted to extract work from hot combustion products received from the combustor.

For the purposes of promoting an understanding of the principles of the disclosure, reference will now be made to a number of illustrative embodiments illustrated in the drawings and specific language will be used to describe the same.

Figure 2:
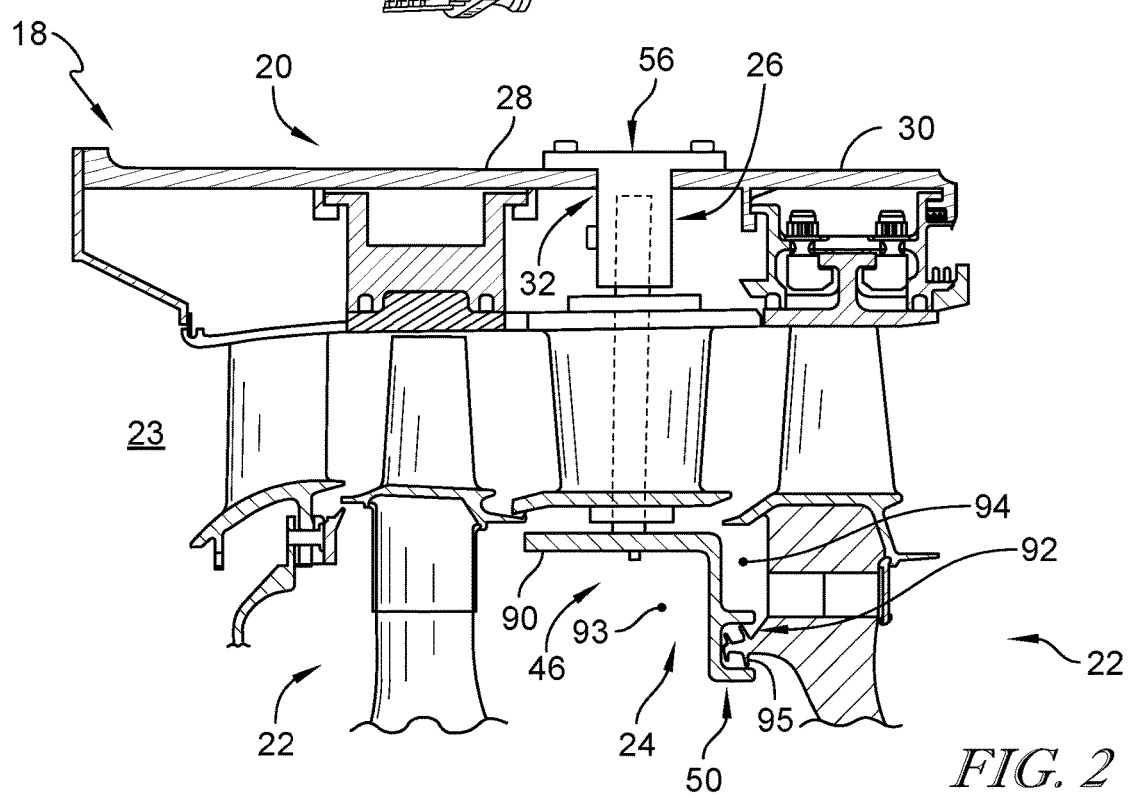
FIG. 2 is a cross sectional view of a portion of the turbine assembly of the gas turbine engine of FIG. 1 showing that the turbine assembly includes a turbine case, a plurality of turbine wheel assemblies, a vane stage made up of a vane with an airfoil and an inner vane seal land engaged by a seal rotor included in a turbine wheel assembly, and a vane-stage support that holds the vane stages in place relative to the turbine case.

A turbine assembly 18 according to the present disclosure is adapted for use in a gas turbine engine 10 as suggested in FIGS. 1 and 2. The gas turbine engine 10 includes a fan 12, a compressor 14, a combustor 16, and the turbine assembly 18. The fan 12 generates thrust for propelling an aircraft. The compressor 14 compresses and delivers air to the combustor 16. The combustor 16 mixes fuel with the compressed air received from the compressor 14 and ignites the fuel. The hot, high-pressure gases from the burning fuel are directed into the turbine 18 where the turbine 18 extracts work from the gases to drive the compressor 14 and the fan 12. In other embodiments, the gas turbine engine 10 may include a shaft, turboprop, or gearbox in place of the fan 12.

The turbine assembly 18 includes a turbine case 20, a plurality of turbine wheel assemblies 22, a vane stage 24, and a vane-stage support 26 as shown in FIG. 2. The turbine case 20 is arranged around a central reference axis 11. Each turbine wheel assembly 22 is configured to interact with the hot combustion gases from the combustor 16 and rotate about a center axis 11 of the gas turbine engine 10 to generate power for driving the compressor 14 and/or the fan 12. The vane stage 24 is located between the turbine wheel assemblies 22 and includes (i) a turbine vane 44 configured to redirect air moving through a primary gas path 23 of the gas turbine engine 10 and (ii) an inner vane seal land 46 that is engaged by a seal rotor 95 to seal compartments within the turbine assembly 18. The vane-stage support 26 holds the turbine vane 44 and an inner vane seal land 46 included in the vane stage 24 in place relative to the turbine case 20.

Figure 3:
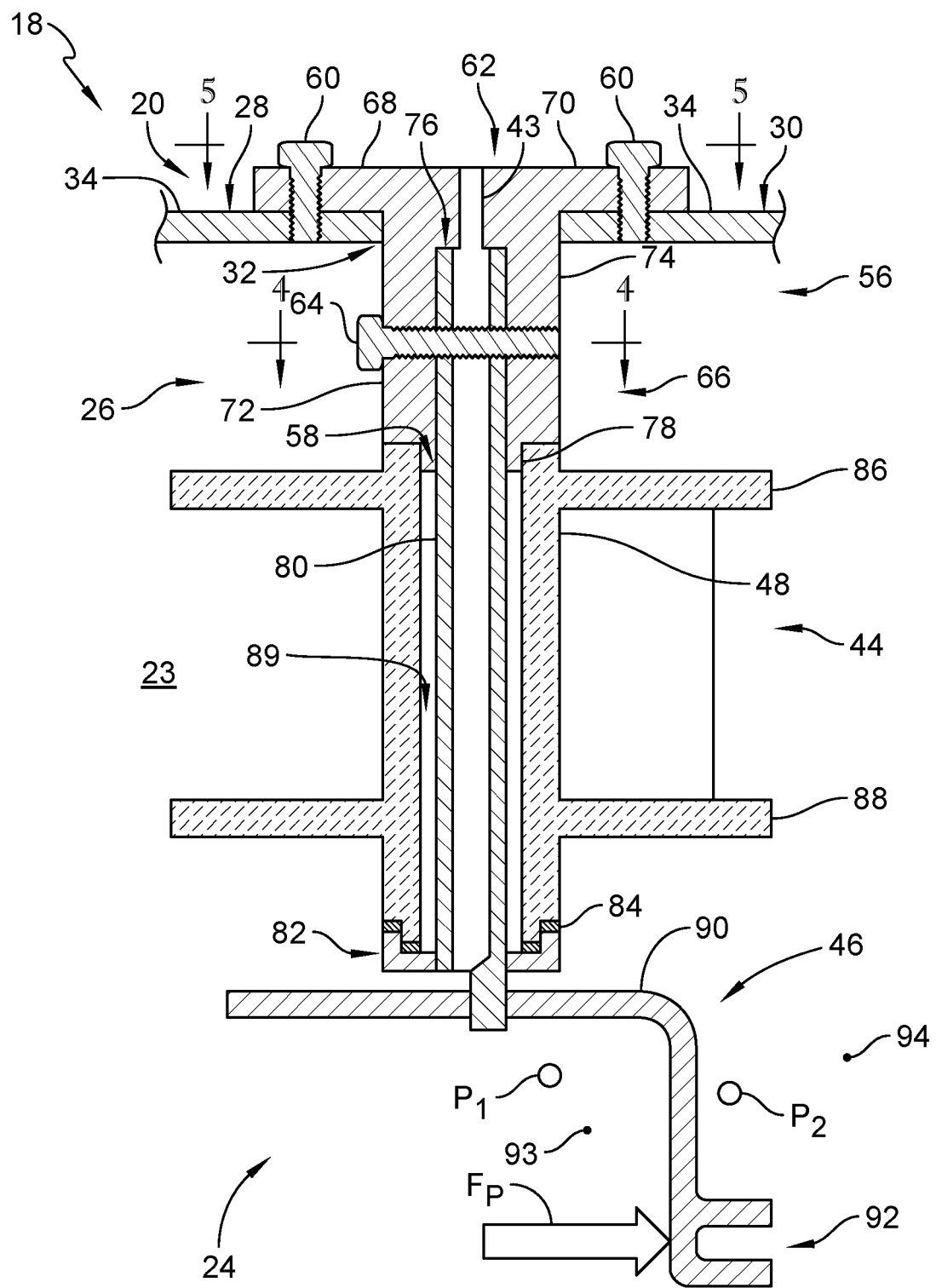
FIG. 3 is a detail view of the turbine assembly of FIG. 2 showing the vane-stage support includes a case mount that extends radially through a portion of the case, a spar that extends from the case mount radially through the airfoil of the turbine vane stage to the inner vane seal land to transmit forces applied to the vane stage to the case mount and out through the turbine case, and a plurality of case fasteners to couple the case mount directly to the case.

The vane-stage support 26 provides cantilevered means for securing the turbine vane 44 and an inner vane seal land 46 included in the vane stage 24 relative to the turbine case 20 as shown in FIGS. 2 and 3. The vane-stage support 26 is secured at a single end thereof to the turbine case 20. With this fixation, the vane stage support 26 is configured to secure the turbine vane 44 and the vane seal land 46 even when aerodynamic loads are applied to the turbine vane 44 and pressure loads (P1/P2) are applied to the inner vane seal land 46 during use of the turbine assembly 18 in the engine 10.

In the illustrative embodiment, the turbine vane 44 included in the vane stage 24 comprises ceramic matrix materials while the vane-stage support 26 comprises metallic materials. The ceramic matrix composite vane 44 is adapted to withstand high temperatures, but may have relatively low strength compared to the metallic vane-stage support 26. The vane-stage support 26 provides structural strength to the vane stage components 44, 46 by receiving the force loads, such as the aerodynamic loads applied to the vane 44 and the axial loads applied to the inner vane seal land 46, and transferring the loads directly from the vane-stage support 26 out through the casing 20.

The turbine case 20 includes a forward casing 28 and an aft casing 30 as shown in FIGS. 2 and 3. The aft casing 30 is spaced axially aft from the forward casing 28 to form a mount aperture 32 in the case 20 that receives a portion of the vane-stage support 26.

The vane stage 24 includes the turbine vane 44 and the inner vane seal 46 land as shown in FIG. 3. The turbine vane 44 comprising ceramic matrix composite materials is shaped to form an airfoil 48 that extends across the primary gas path 23 of the gas turbine engine. The inner vane seal land 46 is located radially inward of the turbine vane 44 and is configured to be engaged by the rotating component 95 to create a compartment seal 50 separating pressure zones P1 and P2 within the gas turbine engine 10 when the turbine assembly 18 is used in the gas turbine engine 10. The difference of pressure causes a pressure force Fp to act on the inner vane seal land 46, which results in an axial moment in the turbine assembly 18.

The vane-stage support 26 includes a case mount 56, a spar 58, and a plurality of threaded flange fasteners 60 as shown in FIG. 3. The case mount 56 extends radially through the case 20 and receives a portion of the spar 58. The spar 58 extends from the case mount 56 radially through the airfoil 48 of the turbine vane 44 to the inner vane seal land 46. The threaded flange fasteners 60 located forward and aft of the mount aperture 32 secure the case mount 56 to the case 20 at the both the forward and aft casings 28, 30.

In the illustrative embodiment, the turbine vane 44 and the inner vane seal land 46 are coupled to the spar 58 so that forces applied to the vane stage 24 are carried by the spar 58 to the case mount 56 and case 20 during use of the turbine assembly 18 in the gas turbine engine 10. The turbine vane 44 engages the spar 58 at both radially inner and outer ends of the turbine vane 44 outside the primary gas path 23 to transfer aerodynamic loads applied to the airfoil 48 from the spar 58 directly to the turbine case 20. The inner vane seal land 46 engages the spar 58 radially inward of the vane 44 to transfer axial loads, such as the pressure force Fp applied to the seal land 46 from the spar 58 directly to the turbine case 20.

In the illustrative embodiment, the case mount 56 and the spar 58 are individually machined components and assembled as shown in FIG. 3. In other embodiments, the case mount 56 and the spar 58 may be integrally formed such that the case mount 56 and the spar 58 are included in a one-piece support component.

The case mount 56 includes a coupling flange 62 and a threaded fixture fastener 64 as shown in FIG. 3. The coupling flange 62 extends along a radially-outwardly facing surface 34 of the case 20. In the illustrative embodiment, the coupling flange 62 extends forward and aft of the mount aperture 32 along the radially-outwardly facing surface 34 of the case 20 and a portion 66 of the coupling flange 62 extends radially inward through the mount aperture 32 to couple with the spar 58. The threaded fixture fastener 64 extends axially through the coupling flange 62 and the portion of the spar 58 received within the coupling flange 62 and applies a clamp load onto the coupling flange 62 and the portion of the spar 58 to couple the coupling flange 62 and the spar 58 together.

The coupling flange 62 includes a spar fixture 66, a forward portion 68, and an aft portion 70 as shown in FIG. 3. The spar fixture 66 extends radially-inwardly from the coupling flange 62 through the mount aperture 32 formed in the case 20 and the spar 58 is coupled to the spar fixture 66 inside the case 20. The forward portion 68 extends axially forward of the mount aperture 32 from the spar fixture 66. The aft portion 70 extends axially aft of the mount aperture 32 from the spar fixture 66.

Figure 5:
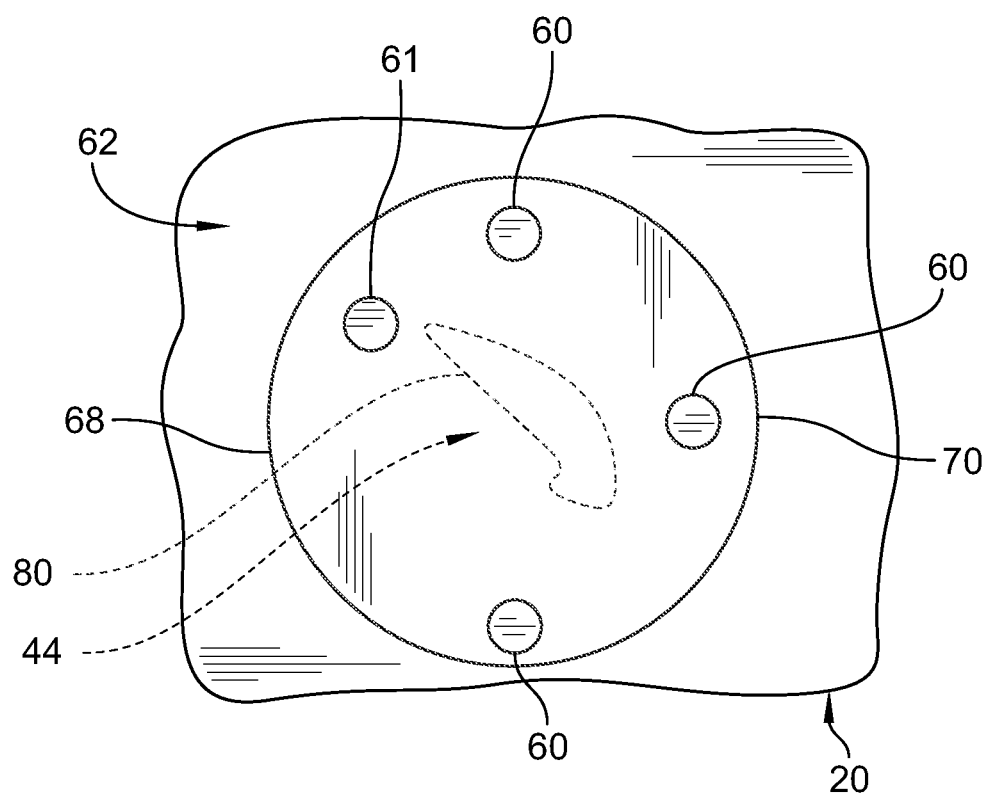
FIG. 5 is a top view of the turbine assembly of FIG. 3 taken along line 5-5 showing that the plurality of case fasteners are arranged around a center of the case mount and showing that one of the case fasteners is arranged off-center of the case mount to provide correct alignment of the vane-stage support relative to the vane stage at installation.

In the illustrative embodiment, threaded flange fasteners 60 extend radially through the forward portion 68 and the aft portion 70 of the coupling flange 62 to secure the forward portion 68 and the aft portion 70 of the coupling flange 62 to the case 20. In the illustrative embodiment of FIG. 5, the plurality of threaded fasteners 60 includes four fasteners 60, 61 to secure the coupling flange 62 to the case 20 and at least one of the fasteners 61 is offset from the other threaded fasteners 60 to correctly align the vane-stage support 26 during installation of the vane-stage support 26.

In other embodiments, a minimum of one fastener 61 may be used to secure the coupling flange 62 to the case 20 provided that the necessary anti-rotation features and deflection features are included in the case 20. In some embodiments, at least two fasteners 60, 61 may be used to secure the coupling flange 62 to the case 20. In other embodiments, at least three fasteners 60, 61 may be used to secure the coupling flange 62 to the case 20. The number of threaded fasteners 60, 61 used to secure the coupling flange 62 to the case 20 is a compromise between the size, weight, and cost of the assembly 18 and the pre-load capability.

The spar fixture 66 includes at least two retainer legs 72, 74 as shown in FIG. 3. The retainer legs 72, 74 are arranged on opposite sides of the spar 58 and clamp onto the spar 58 to couple the spar 58 to the case mount 56. In the illustrative embodiment, the retainer legs 72, 74 extend around the spar 58 on either side of the spar 58 to form a complete ring around the spar 58 like as shown in FIG. 4.

In the illustrative embodiment, the spar fixture 66 defines a radially-inwardly opening spar-receiver space 76 inside the case 20. The retainer legs 72, 74 extend on either side to define the spar-receiver space 76 and the spar 58 is arranged in part within the spar-receiver space 76 like as shown in FIG. 4.

In the illustrative embodiment, the coupling flange 62 is formed to include a cavity 63 that extends radially through the coupling flange 62 between the forward and aft portions 68, 70 and opens into the spar-receiver space 76. The cavity 63 is arranged to transmit cooling air to spar-receiver space 76.

Figure 4:
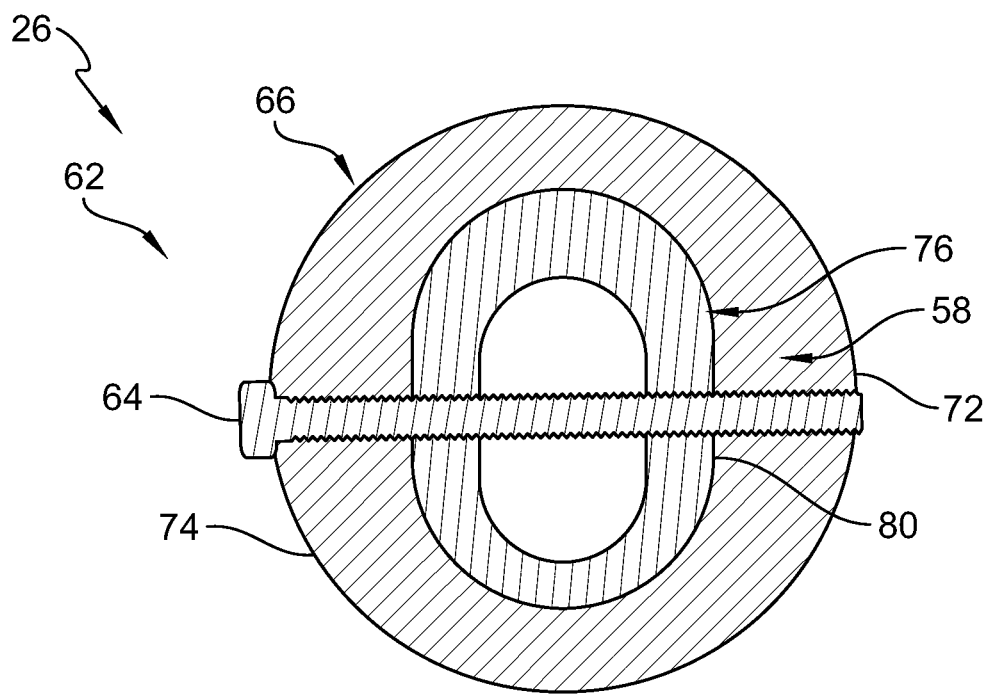
FIG. 4 is a cross sectional view of the turbine assembly of FIG. 3 taken along line 4-4 showing that the spar extends radially through a portion of the case mount and a clamp fastener extends axially through the portion of the spar and the case mount to clamp the spar and the case mount together.

In the illustrative embodiment, the threaded fixture fastener 64 extends axially into the forward retainer leg 72 of the spar fixture 66, through the portion of the spar 58 received in the spar-receiver space 76, and into the aft retainer leg 74 like as shown in FIGS. 3 and 4. The threaded fixture fastener 64 extending through the spar fixture 66 and the spar 58, applies a clamp load onto the at least two retainer legs 72, 74 of the spar fixture 66 to clamp the spar 58 therebetween.

In some embodiments, the spar fixture 66 of the vane-stage support 26 is engaged directly by the turbine vane 44 of the vane stage 24 so that forces applied to the turbine vane 44 are carried by the case mount 56 to the case 20 during use of the turbine assembly 18 in the gas turbine engine 10. The direct engagement of the spar fixture 66 to the turbine vane 44 also helps counteract vane tilting of the vane 44.

In the illustrative embodiment, the spar fixture 66 further includes an outer load transfer collar 78 as shown in FIG. 3. The outer load transfer collar 78 extends around the spar 58 and engages directly with an interior side of the airfoil 48 formed by the turbine vane 44 so that forces applied to the turbine vane 44 are carried by the case mount 56 to the case 20 during use of the turbine assembly 18 in the gas turbine engine 10.

The spar 58 includes a rod 80 and an inner load transfer collar 82 as shown in FIG. 3. The rod 80 extends radially through the airfoil 48 of the turbine vane 44. In the illustrative embodiment, the rod 80 is hollow and is in fluid communication with the cavity 63 to transmit cooling air to the inter-disk cavity between the turbine wheels 22 as shown in FIG. 3. In some embodiments, the rod 80 may also include cooling holes to transmit cooling air to the vane 44. The inner load transfer collar 82 is spaced radially inwardly of the vane 44 and extends axially forward and aft of the rod 80 and contacts the turbine vane 44 a radially inner end of the turbine vane 44.

In the illustrative embodiment, the inner load transfer collar 82 contacts the turbine vane 44 at the radially inner end of the turbine vane 44 to transfer aerodynamic loads applied to the vane 44 from the vane 44 to the spar 58 at the radially inner end of the vane 44. The inner load transfer collar 82 contacts the turbine vane 44 at the radially inner end of the vane 44 so that the loads are transferred from the vane 44 to the vane-stage support 26 outside of the primary gas path 23.

In the illustrative embodiment, the inner load transfer collar 82 is a separate component assembled onto the rod 80 and fixed to the rod 80 by a suitable fastener such as a screwed joint, collet arrangement, clamp, or other suitable fastener. In some embodiments, the inner load transfer collar 82 is integrally formed with a portion of the inner vane seal land 46. In other embodiments, the inner load transfer collar 82 may be integrally formed with the rod 80 such that the rod 80 and the inner load transfer collar 82 are included in a one-piece support component.

In the illustrative embodiment, a compliant layer 84 is arranged between the radially inner end of the turbine vane 44 and the inner load transfer collar 82 like as shown in FIG. 3. The compliant layer 84 is configured to seal between the radially inner end of the turbine vane 44 and the inner load transfer collar 82. The compliant layer 84 is also configured to allow radial movement of the turbine vane 44 relative to the vane-stage support 26 in response to thermal growth mismatch between the vane 44 and the vane-stage support 26 caused by different coefficients of thermal expansion of the vane 44 and the support 26 during use of the turbine assembly 18.

Turning again to the vane stage 24, the turbine vane 44 includes the airfoil 48, an outer end wall 86, and an inner end wall 88 as shown in FIG. 3. The inner end wall 88 is spaced radially inward of the outer end wall 86. The airfoil 48 extends between and interconnects the outer end wall 86 and the inner end wall 88. The airfoil 48 is shaped to redirect air moving along the primary gas path 23 of the turbine assembly 18 that extends radially from the outer end wall 86 to the inner end wall 88. The airfoil 48 is also shaped to include a vane cavity 89 extending radially through the airfoil 48 and opens at the inner and outer end walls 86, 88. The outer end wall 86 defines a radially outer boundary of the primary gas path 23 and the inner end wall 88 defines a radially inner boundary of the primary gas path 23.

In the illustrative embodiment, the outer end wall 86, inner end wall 88, and the airfoil 48 of the vane 44 are integrally formed from ceramic matrix composite materials such that the outer end wall 86, inner end wall 88, and the airfoil 48 are included in a one-piece vane component as shown in FIGS. 2 and 3. In other embodiments, the outer end wall 86, inner end wall 88, and the airfoil 48 may be formed as separate components.

The inner vane seal land 46 includes a seal panel 90 and seal lands 92 as shown in FIGS. 2 and 3. The seal panel 90 divides the inter-disk cavity into axially adjacent compartments 93, 94 within the turbine assembly 18. The seal lands 92 extend axially aft and away from the seal panel 90. At least one seal land 92 is engaged by a rotatable seal element 96 of the turbine wheel 22 as shown in FIG. 2. In the illustrative embodiment, both seal lands 92 are engaged with the rotating seal element 95 to form the compartment seal 50 between the upstream and downstream turbine wheel assemblies 22. In some embodiments, the inner load transfer collar 82 is integrally formed with the seal panel 90 of the inner vane seal land 46.

The compartment seal 50 between the upstream and downstream turbine wheel assemblies 22 results in a first pressure P1 on the upstream turbine wheel side and a second pressure P2 on the downstream turbine wheel side. In the illustrative embodiment, the first pressure P1 is greater than the second pressure P2 resulting in a difference of pressure on either side of the inner vane seal land 46. The difference of pressure causes the pressure force Fp to act on the inner vane seal land 46 as shown in FIG. 3. The pressure force Fp results in an axial moment in the turbine assembly 18.

In the illustrative embodiment, the forward and aft portions 68, 70 of the coupling flange 62 extend axially forward of and axially aft of the mount aperture 32 to increase the area of the case 20 contacted by the coupling flange 62. Increasing the area of the case 20 contacted by the coupling flange 62 also increases the second moment of area of the coupling flange 62, which reduces the stress in the casing 20 as a result of transferring the axial moment loads from the inner vane seal land 46.

Figure 6:
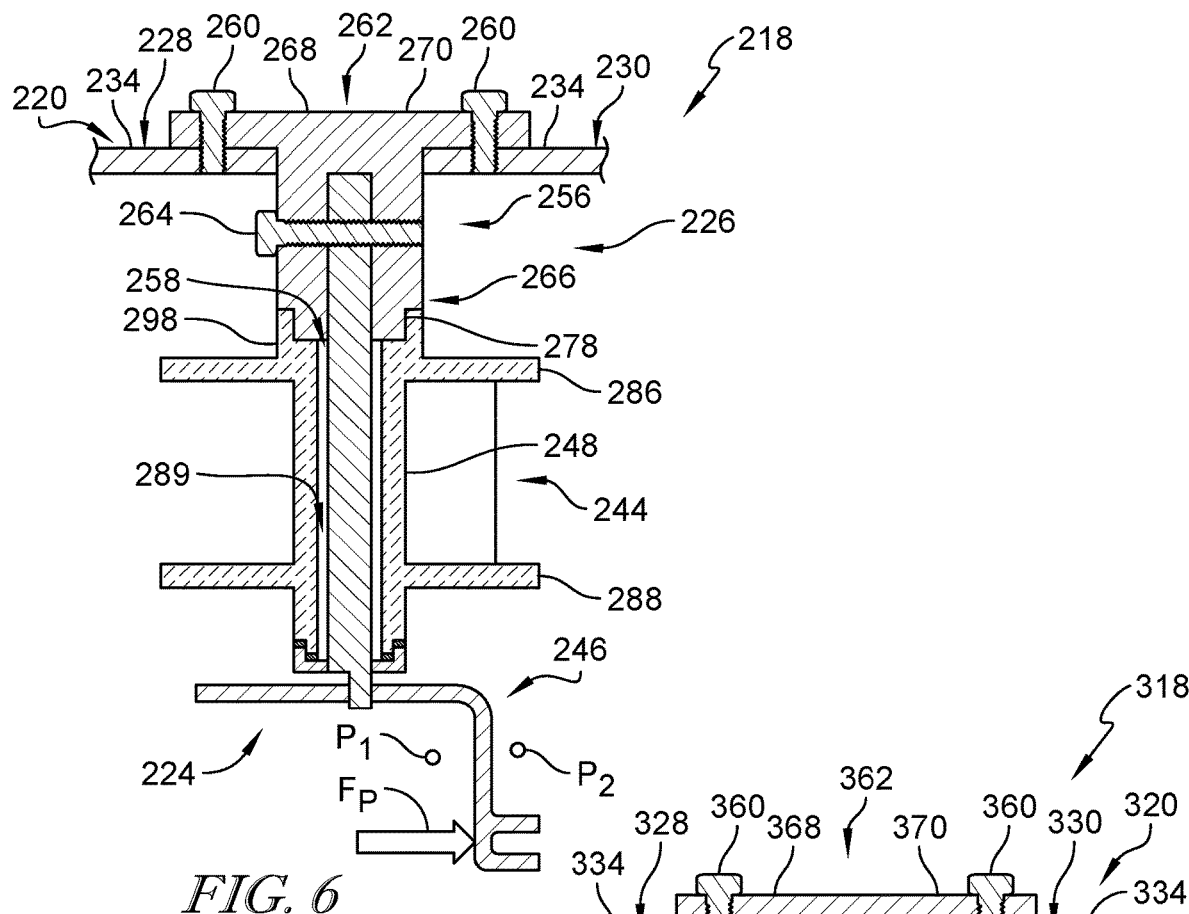
FIG. 6 is a detail view of another embodiment of a vane-stage support to be included in the turbine assembly of FIG. 2 showing that the vane-stage support includes a case mount that extends radially through a portion of the case, and further showing that the case mount includes an outer load transfer collar that contacts the vane at a radially outer end of the turbine vane on an inner surface of the vane to transfer aerodynamic loads from the vane to the vane-stage support.

Another embodiment of a turbine assembly 218 in accordance with the present disclosure is shown in FIG. 6. The turbine assembly 218 is substantially similar to the turbine assembly 18 shown in FIGS. 1-3 and described herein. Accordingly, similar reference numbers in the 200 series indicate features that are common between the turbine assembly 18 and the turbine assembly 218. The description of the turbine assembly 18 is incorporated by reference to apply to the turbine assembly 218, except in instances when it conflicts with the specific description and the drawings of the turbine assembly 218.

The turbine assembly 218 includes a turbine case 220, a vane stage 224, and a vane-stage support 226 as shown in FIG. 6. The vane stage 224 is located between the turbine wheel assemblies 22 and includes a turbine vane 244 configured to redirect air received from an upstream turbine wheel assembly 22 moving through a primary gas path 23 of the gas turbine engine 10 toward a downstream turbine wheel assembly 22. The vane-stage support 226 is configured to hold the turbine vane 244 and an inner vane seal land 246 included in the vane stage 224 in place relative to the turbine case 220.

The vane-stage support 226 includes a case mount 256, a spar 258, and a plurality of threaded flange fasteners 260 as shown in FIG. 6. The case mount 256 extends radially through the case 220. The spar 258 extends from the case mount 256 radially through an airfoil 248 of a turbine vane 244 to an inner vane seal land 246 included in the vane stage 224. The threaded flange fasteners 260 located forward and aft of the mount aperture 232 secure the case mount 256 to the case 220 at the both the forward and aft casings 228, 230.

The case mount 256 includes a coupling flange 262 and a threaded fixture fastener 264 as shown in FIG. 6. The coupling flange 262 includes a spar fixture 266, a forward portion 268, and an aft portion 270 as shown in FIG. 6. The spar fixture 266 extends radially-inwardly from the coupling flange 262 through the mount aperture 232 formed in the case 220 and the spar 258 is coupled to the spar fixture 266 inside the case 220. The forward portion 268 extends axially forward of the mount aperture 232 from the spar fixture 266. The aft portion 270 extends axially aft of the mount aperture 232 from the spar fixture 266.

In some embodiments, the spar fixture 266 of the vane-stage support 226 is engaged directly by the turbine vane 244 of the vane stage 224 so that forces applied to the turbine vane 244 are carried by the case mount 256 to the case 20 during use of the turbine assembly 218 in the gas turbine engine 10. The direct engagement of the spar fixture 266 to the turbine vane 244 also helps counteract vane tilting of the vane 244.

In the illustrative embodiment, the spar fixture 266 further includes an outer load transfer collar 278 as shown in FIG. 6. The outer load transfer collar 278 extends around the spar 258 and engages directly with an interior side of the airfoil 248 formed by the turbine vane 244 so that forces applied to the turbine vane 244 are carried by the case mount 256 to the case 220 during use of the turbine assembly 218 in the gas turbine engine 10.

Turning again to the turbine vane 244 of the vane stage 224, the turbine vane 244 includes an airfoil 248, an outer end wall 286, and an inner end wall 288 as shown in FIG. 6. The inner end wall 288 is spaced radially inward of the outer end wall 286. The airfoil 248 extends between and interconnects the outer end wall 286 and the inner end wall 288. The airfoil 248 is shaped to redirect air moving along the primary gas path 23 of the turbine assembly 218 that extends radially from the outer end wall 286 to the inner end wall 88. The airfoil 248 is also shaped to include a vane cavity 289 extending radially through the airfoil 248 and opens at the inner and outer end walls 286, 288. The outer end wall 286 defines a radially outer boundary of the primary gas path 23 and the inner end wall 288 defines a radially inner boundary of the primary gas path 23.

In the illustrative embodiment, the airfoil 248 includes a radially outer load transfer extension 298 as shown in FIG. 6. The outer load transfer extension extends radially outward from the outer end wall 286 of the vane 244 and is engaged by the outer load transfer collar 278 of the spar fixture 266. The outer load transfer collar 278 engages the interior side of the extension 298.

Figure 7:
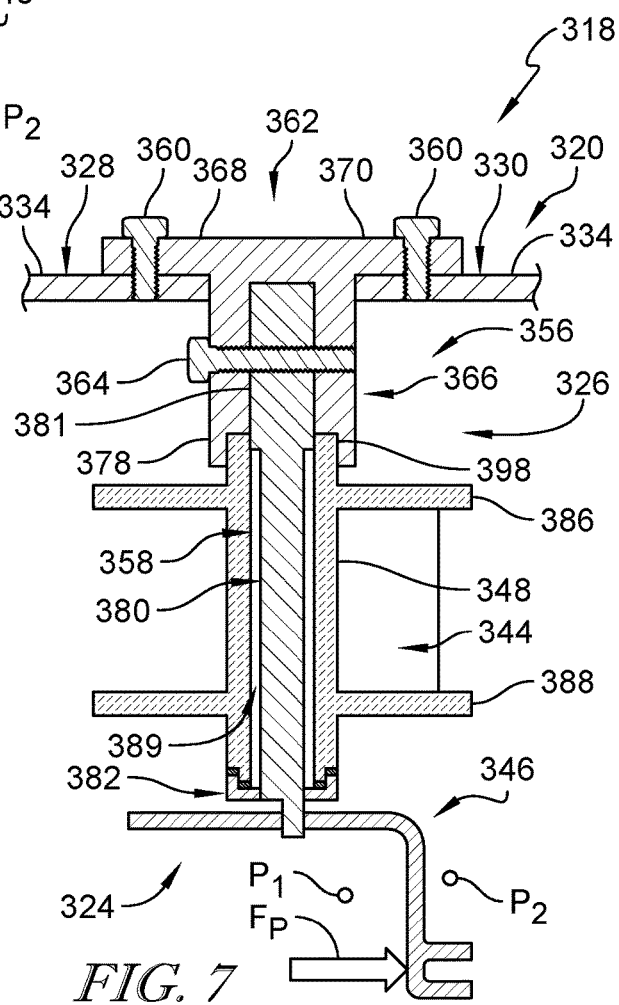
FIG. 7 is a detail view of another embodiment of a vane-stage support to be included in the turbine assembly of FIG. 2 showing that the vane stage includes a case mount that extends radially through a portion of the case and further showing that the case mount includes an outer load transfer collar that contacts the vane at a radially outer end of the turbine vane on an outer surface of the vane to transfer aerodynamic loads from the vane to the vane-stage support.

Another embodiment of a turbine assembly 318 in accordance with the present disclosure is shown in FIG. 7. The turbine assembly 318 is substantially similar to the turbine assembly 18 shown in FIGS. 1-3 and described herein. Accordingly, similar reference numbers in the 300 series indicate features that are common between the turbine assembly 18 and the turbine assembly 318. The description of the turbine assembly 18 is incorporated by reference to apply to the turbine assembly 318, except in instances when it conflicts with the specific description and the drawings of the turbine assembly 318.

The turbine assembly 318 includes a turbine case 320, a vane stage 324, and a vane-stage support 326 as shown in FIG. 7. The vane stage 324 is located between the turbine wheel assemblies 22 and includes a turbine vane 344 configured to redirect air received from an upstream turbine wheel assembly 22 moving through a primary gas path 23 of the gas turbine engine 10 toward a downstream turbine wheel assembly 22. The vane-stage support 326 is configured to hold the turbine vane 344 and an inner vane seal land 346 included in the vane stage 324 in place relative to the turbine case 320.

The vane-stage support 326 includes a case mount 356, a spar 358, and a plurality of threaded flange fasteners 360 as shown in FIG. 7. The case mount 356 extends radially through the case 320. The spar 358 extends from the case mount 356 radially through an airfoil 348 of a turbine vane 344 to an inner vane seal land 346 included in the vane stage 324. The threaded flange fasteners 360 located forward and aft of the mount aperture 332 secure the case mount 356 to the case 320 at the both the forward and aft casings 328, 330.

The case mount 356 includes a coupling flange 362 and a threaded fixture fastener 364 as shown in FIG. 7. The coupling flange 362 includes a spar fixture 366, a forward portion 368, and an aft portion 370 as shown in FIG. 7. The spar fixture 366 extends radially-inwardly from the coupling flange 362 through the mount aperture 332 formed in the case 320 and the spar 358 is coupled to the spar fixture 366 inside the case 320. The forward portion 368 extends axially forward of the mount aperture 332 from the spar fixture 366. The aft portion 370 extends axially aft of the mount aperture 332 from the spar fixture 366.

In some embodiments, the spar fixture 366 of the vane-stage support 326 is engaged directly by the turbine vane 344 of the vane stage 324 so that forces applied to the turbine vane 344 are carried by the case mount 356 to the case 20 during use of the turbine assembly 318 in the gas turbine engine 10. The direct engagement of the spar fixture 366 to the turbine vane 344 also helps counteract vane tilting of the vane 344.

In the illustrative embodiment, the spar fixture 366 further includes an outer load transfer collar 378 as shown in FIG. 7. The outer load transfer collar 378 extends around the spar 358 and engages directly with an exterior side of the airfoil 348 formed by the turbine vane 344 so that forces applied to the turbine vane 344 are carried by the case mount 356 to the case 320 during use of the turbine assembly 318 in the gas turbine engine 10.

The spar 358 includes a rod 380 and an inner load transfer collar 382 as shown in FIG. 7. The rod 380 is coupled to the spar fixture 366 of the coupling flange 362 and extends radially through the airfoil 48 of the turbine vane 344. In the illustrative embodiment, a radially outer portion 381 of the rod 380 coupled to the spar fixture 366 is thicker than the portion extending radially through the airfoil 348. The radially outer portion of the rod 380 engages an interior side of the airfoil 348 to transfer aerodynamic loads from the vane 344 to the spar 358 at the outer end of the vane 344. The inner load transfer collar 382 is spaced radially inwardly of the vane 344 and extends axially forward and aft of the rod 380 and contacts the turbine vane 344 a radially inner end of the turbine vane 344.

Turning again to the turbine vane 344 of the vane stage 324, the turbine vane 344 includes an airfoil 348, an outer end wall 386, and an inner end wall 388 as shown in FIG. 7. The inner end wall 88 is spaced radially inward of the outer end wall 386. The airfoil 348 extends between and interconnects the outer end wall 386 and the inner end wall 388. The airfoil 348 is shaped to redirect air moving along the primary gas path 23 of the turbine assembly 318 that extends radially from the outer end wall 386 to the inner end wall 388. The airfoil 348 is also shaped to include a vane cavity 389 extending radially through the airfoil 348 and opens at the inner and outer end walls 386, 388. The outer end wall 386 defines a radially outer boundary of the primary gas path 23 and the inner end wall 388 defines a radially inner boundary of the primary gas path 23.

In the illustrative embodiment, the airfoil 348 includes a radially outer load transfer extension 398 as shown in FIG. 7. The outer load transfer extension 398 extends radially outward from the outer end wall 386 of the vane 344 and is engaged by the outer load transfer collar 378 of the spar fixture 366. The outer load transfer collar 378 engages the exterior side of the extension 398. The radially outer portion 381 of the rod 380 engages the interior side of the extension 398.

Figure 8:
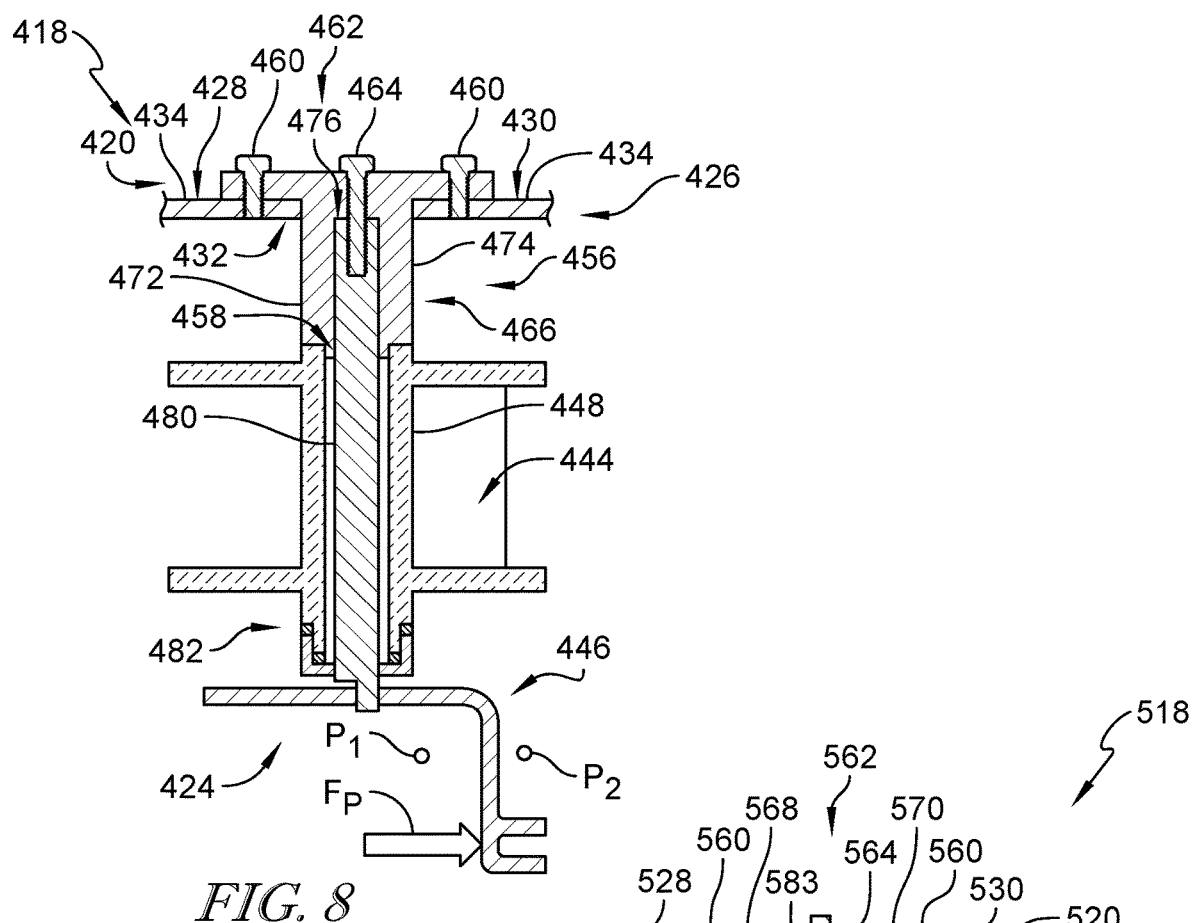
FIG. 8 is a detail view of another embodiment of a vane-stage support to be included in the turbine assembly of FIG. 2 showing the vane-stage support includes a case mount that extends radially through a portion of the turbine case and a spar, and further showing that the case mount includes a clamp fastener that extends radially through the case mount and into the spar to couple the case mount and the spar together.

Another embodiment of a turbine assembly 418 in accordance with the present disclosure is shown in FIG. 8. The turbine assembly 418 is substantially similar to the turbine assembly 18 shown in FIGS. 1-3 and described herein. Accordingly, similar reference numbers in the 400 series indicate features that are common between the turbine assembly 18 and the turbine assembly 418. The description of the turbine assembly 18 is incorporated by reference to apply to the turbine assembly 418, except in instances when it conflicts with the specific description and the drawings of the turbine assembly 418.

The turbine assembly 418 includes a turbine case 420, a vane stage 424, and a vane-stage support 426 as shown in FIG. 8. The turbine case 420 is arranged around a central reference axis 11. The vane stage 424 is located between the turbine wheel assemblies 22 and includes a turbine vane 444 configured to redirect air received from an upstream turbine wheel assembly 22 moving through a primary gas path 23 of the gas turbine engine 10 toward a downstream turbine wheel assembly 22. The vane-stage support 426 is configured to hold the turbine vane 444 and an inner vane seal land 446 included in the vane stage 424 in place relative to the turbine case 420.

The vane-stage support 426 includes a case mount 456, a spar 458, and a plurality of threaded flange fasteners 460 as shown in FIG. 8. The case mount 456 extends radially through a mount aperture 432 in the case 420. The spar 458 extends from the case mount 456 radially through an airfoil 448 of the turbine vane 444 to the inner vane seal land 446. The threaded flange fasteners 460 located forward and aft of the mount aperture 432 and secure the case mount 456 to the case 420 at the both forward and aft casings 428, 430.

The case mount 456 includes a coupling flange 462 and a threaded fixture fastener 464 as shown in FIG. 8. The coupling flange 462 extends along a radially-outwardly facing surface 434 of the case 420. In the illustrative embodiment, the coupling flange 462 extends forward and aft of the mount aperture 432 along the radially-outward facing surface 434 of the case 420 and a portion of the coupling flange 462 extends radially inward through the mount aperture 432 to couple with the spar 458. The threaded fixture fastener 464 extends through the coupling flange 462 radially into the spar 458 to couple the spar 458 to the coupling flange 462.

The coupling flange 462 includes a spar fixture 466, a forward portion 468, and an aft portion 470 as shown in FIG. 8. The spar fixture 466 extends radially-inwardly from the coupling flange 462 through the mount aperture 432 formed in the case 420 and the spar 458 is coupled to the spar fixture 466 inside the case 420. The forward portion 468 extends axially forward of the mount aperture 432 from the spar fixture 466. The aft portion 470 extends axially aft of the mount aperture 432 from the spar fixture 466.

The spar fixture 466 includes at least two retainer legs 472, 474 as shown in FIG. 8. The retainer legs 472, 474 are arranges on opposite sides of the spar 458 and position and align the spar 458 relative to the case mount 456. In the illustrative embodiment, the spar fixture 466 defines a radially-inwardly opening spar-receiver space 476 inside the case 420. The retainer legs 472, 474 extend on either side to define the spar-receiver space 476 and the spar 458 is arranged in part within the spar-receiver space 476.

In the illustrative embodiment, the threaded fixture fastener 464 extends radially through the coupling flange 462 between the forward retainer leg 472 and the aft retainer leg 474 and into the portion of the spar 458 received in the spar-receiver space 476. The threaded fixture fastener 464 extending through the spar fixture 466 and the spar 458, applies a clamp load onto the spar fixture 466 to clamp the spar 458 therebetween.

The spar 458 includes a rod 480 and an inner load transfer collar 482 as shown in FIG. 8. The rod 480 extends radially through the airfoil 448 of the turbine vane 444. In some embodiments, the rod 480 may be hollow and include cooling holes to transmit cooling air to the vane 444 and/or into the inter-disk cavity between the turbine wheels 22. The inner load transfer collar 482 is spaced radially inwardly of the vane 44 and extends axially forward and aft of the rod 480 and contacts the turbine vane 444 a radially inner end of the turbine vane 444. In the illustrative embodiment, the threaded fixture fastener 464 extends radially into the rod 480 of the spar 458.

Figure 9:
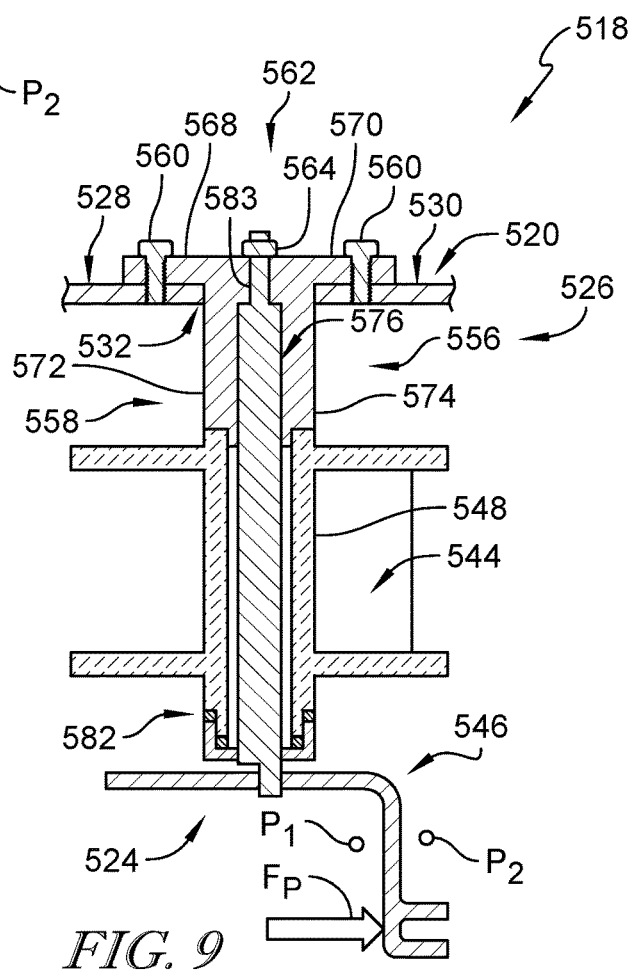
FIG. 9 is a detail view of another embodiment of a vane-stage support to be included in the turbine assembly of FIG. 2 showing the vane-stage support includes a case mount that extends radially through a portion of the turbine case and a spar, and further showing that the spar includes a mount extension that extends radially-outwardly through the case mount and outside of the case and engages a clamp fastener included in the case mount to couple the spar and the case mount together.

Another embodiment of a turbine assembly 518 in accordance with the present disclosure is shown in FIG. 9. The turbine assembly 518 is substantially similar to the turbine assembly 18 shown in FIGS. 1-3 and described herein. Accordingly, similar reference numbers in the 500 series indicate features that are common between the turbine assembly 18 and the turbine assembly 518. The description of the turbine assembly 18 is incorporated by reference to apply to the turbine assembly 518, except in instances when it conflicts with the specific description and the drawings of the turbine assembly 518.

The turbine assembly 518 includes a turbine case 520, a vane stage 524, and a vane-stage support 526 as shown in FIG. 9. The turbine case 520 is arranged around a central reference axis 11. The vane stage 524 is located between the turbine wheel assemblies 22 and includes a turbine vane 544 configured to redirect air received from an upstream turbine wheel assembly 22 moving through a primary gas path 23 of the gas turbine engine 10 toward a downstream turbine wheel assembly 22. The vane-stage support 526 is configured to hold the turbine vane 544 and an inner vane seal land 546 included in the vane stage 524 in place relative to the turbine case 520.

The vane-stage support 526 includes a case mount 556, a spar 558, and a plurality of threaded flange fasteners 560 as shown in FIG. 9. The case mount 556 extends radially through a mount aperture 532 in the case 520. The spar 558 extends from the case mount 556 radially through an airfoil 548 of the turbine vane 544 to the inner vane seal land 546. The threaded flange fasteners 560 located forward and aft of the mount aperture 532 and secure the case mount 556 to the case 520 at the both forward and aft casings 528, 530.

The case mount 556 includes a coupling flange 562 and a fixture fastener 564 as shown in FIG. 9. The coupling flange 562 includes a spar fixture 566, a forward portion 568, and an aft portion 570. The spar fixture 566 extends radially-inwardly from the coupling flange 562 through the mount aperture 532 formed in the case 520 and the spar 558 is coupled to the spar fixture 566 inside the case 520. The forward portion 568 extends axially forward of the mount aperture 532 from the spar fixture 566. The aft portion 570 extends axially aft of the mount aperture 532 from the spar fixture 566.

The spar fixture 566 includes at least two retainer legs 572, 574 as shown in FIG. 9. The retainer legs 572, 574 are arranged on opposite sides of the spar 558 and position and align the spar 558 relative to the case mount 556. In the illustrative embodiment, the spar fixture 566 defines a radially-inwardly opening spar-receiver space 576 that extends radially through the case spar coupling flange 562. The retainer legs 572, 574 extend on either side to define the spar-receiver space 576 and the spar 558 is arranged within the spar-receiver space 576.

The spar 558 includes a rod 580, an inner load transfer collar 582, and a rod mount extension 583 as shown in FIG. 9. The rod 580 extends radially through the airfoil 548 of the turbine vane 544. In some embodiments, the rod 580 may be hollow and include cooling holes to transmit cooling air to the vane 544 and/or into the inter-disk cavity between the turbine wheels 22. The inner load transfer collar 582 is spaced radially inwardly of the vane 544 and extends axially forward and aft of the rod 580 and contacts the turbine vane 544 a radially inner end of the turbine vane 544. The rod mount extension 583 extends radially from the rod 580 outward of the turbine case 520.

In the illustrative embodiment, the fixture fastener 564 couples to the rod mount extension 583 radially outward of the coupling flange 562 as shown in FIG. 9. The fixture fastener 564 couples to the rod mount extension 583 to prevent radial inward movement of the spar 558.

The present disclosure teaches a method of transferring vane loading from a metallic spar 58, 258, 358, 458, 558 to the casing 20, 220, 320, 420, 520 by increasing the second moment of area of the vane support 56, 256, 356, 456, 556. In the illustrative embodiments, the turbine assembly 18, 218, 31, 418, 518 requires no complex geometry from the ceramic matrix composite material and may be lightweight. Additionally, the illustrative embodiments also offer cheap manufacturing routes, such as extrusion of parts.

In metallic vanes embodiments, the metallic vanes are supported with a series of hooks and rails. In some metallic embodiments, the nozzle guide vane structure is supported on hooks and/or rails attached to the outer platform. However, the hook/rail design does not work for structures manufactured from the lower strength SiC/SiC ceramic matrix composite materials. Therefore, in some ceramic matrix composite vanes embodiments, a metallic spar is often incorporated in addition to conventional hook/rail joints.

The present disclosure teaches transferring the load from the nozzle guide vanes 44, 244, 344, 444, 544 outboard to the turbine casing 20, 220, 320, 420, 520. In the illustrative embodiments, the aerodynamic loading is transferred at both the inner and outer extents of the vane 44, 244, 344, 444, 544. The load may be transmitted through a metallic structure or spar 58, 258, 358, 458, 558 out into the casing 20, 220, 320, 420, 520. An illustrative example is shown in FIG. 3.

The present disclosure also teaches how the spar 58, 258, 358, 458, 558 may be fixed to the casing 20, 220, 320, 420, 520. In the illustrative embodiment of FIG. 3, the assembly 18 provides a means of attaching a metallic spar 58 for the ceramic matrix composite vane 44 to the casing 20 by making use of a bespoke secondary metallic fixture 56 which extends through a hole 32 in the casing 20. The fixture 56 provides a load transfer pathway for the axial, radial and circumferential loads induced by the aero loading on the vane 44 and the interstage seal loads Fp.

In some embodiments, a single piece may be used for the entire support structure 26, 226, 326, 426, 526, such as the spar 58, 258, 358, 458, 558 and "secondary attachment feature" 56, 256, 356, 456, 556. The single piece component may have potential weight saving and part count reduction. This method of attachment offers a number of advantages including a high and tuneable second moment of area to reduce the stress induced in the casing 20, 220, 320, 420, 520. The illustrative embodiments offer a lightweight option, which does not require any complex geometry to be manufactured in the ceramic matrix composite material.

In the illustrative embodiments, the spar 58, 258, 358, 458, 558 may be hollow with one or more passage to allow coolant to transit from the outer cavity to cool the ceramic matrix composite vane 44, 244, 344, 444, 544, or to transit through to the intra-disc cavity. High pressure air could be supplied into each individual spar 58, 258, 358, 458, 558. In the event of damage to vanes, cooling air may be uninterrupted to the remaining intact vanes 44, 244, 344, 444, 544.

A further advantage of using a metallic spar 58, 258, 358, 458, 558 to support the vane 44, 244, 344, 444, 544 is the implementation of a degree of axial pre-lean of the vane spar 58, 258, 358, 458, 558 into the vane assembly 18, 218, 318, 418, 518. The added degree of axial pre-lean may optimize clearances across the running range and improve the interface with the rotating components.

In the illustrative embodiment of FIG. 3, the "legs" 72, 74 of the top hat feature 56 could be extended to meet the ceramic matrix composite platform to prevent the vane from tilting under load. Additionally, FIGS. 6 and 7 illustrative possible alternatives for attaching the ceramic matrix composite vane 44 and the metallic spar 58 to the bespoke fixture 56. The fixture/spar assembly 26 may be connected out with the engine 10 and dropped into place if straight legs 72, 74 are used.

In the illustrative embodiments, the top hat piece 56, 256, 356, 456, 556 located partially outside the casing 20, 220, 320, 420, 520 may have to be separate and engage with the spars 58, 258, 358, 458, 558 that are pre-installed into the ceramic matrix composite vane ring 24, 224, 324, 424, 524 before being secured to the casing 20, 220, 320, 420, 520.

Additionally, although bolts 60, 260, 360, 460, 560 are shown on the drawing, arrangements with alternative suitable mechanical fasteners are possible.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine assembly adapted for use in a gas turbine engine with a turbine vane comprising ceramic matrix composite materials configured to redirect air moving through a primary gas path of the gas turbine engine, the assembly comprising:

a turbine case arranged around a central reference axis, a vane stage including (a) the turbine vane comprising ceramic matrix composite materials shaped to form an airfoil that extends across the primary gas path of the gas turbine engine between an outer end wall and an inner end wall spaced apart radially from the outer end wall to define the primary gas path and (b) an inner vane seal land located radially inward of the turbine vane, the inner vane seal land configured to be engaged by a rotating component to create seal separating pressure zones within the gas turbine engine when the turbine assembly is used in the gas turbine engine, and a vane-stage support comprising metallic materials that is configured to hold the turbine vane and the inner vane seal land in place relative to the turbine case, the vane-stage support including (1) a case mount that extends radially through the turbine case and (2) a spar that extends from the case mount radially through the airfoil of the turbine vane to the inner vane seal land, wherein the turbine vane and the inner vane seal land are coupled to the spar so that forces applied to the vane stage are carried by the spar to the case mount and case during use of the turbine assembly in the gas turbine engine, wherein the case mount includes a coupling flange that extends along a radially-outwardly facing surface of the turbine case and a spar fixture that extends radially-inwardly from the coupling flange through a mount aperture formed in the turbine case, and the spar is coupled to the spar fixture radially inward of the turbine case, and wherein the airfoil includes an outer load transfer extension that extends radially outward from the outer end wall and the spar fixture of the vane-stage support engages directly with one of an interior side or an exterior side of the outer load transfer extension of the airfoil so that forces applied to the turbine vane are carried directly through the spar fixture and the coupling flange to the turbine case during use of the turbine assembly in the gas turbine engine.

2. The assembly of claim 1, wherein the spar fixture defines a radially-inwardly opening spar-receiver space inside the turbine case and the spar arranged in part within the spar-receiver space.

3. The assembly of claim 1, wherein the spar fixture includes at least two retainer legs that extend around the spar and clamp onto the spar to couple the spar to the case mount.

4. The assembly of claim 3, wherein the case mount includes a threaded fixture fastener that applies a clamp load onto the at least two retainer legs of the spar fixture to clamp the spar therebetween.

5. The assembly of claim 1, wherein the coupling flange includes a forward portion that extends axially forward of the mount aperture and an aft portion that extends axially aft of the mount aperture.

6. The assembly of claim 5, wherein the vane-stage support includes threaded flange fasteners located forward and aft of the mount aperture that secure the forward portion and the aft portion of the coupling flange to the turbine case.

7. The assembly of claim 1, wherein the spar fixture includes an outer load transfer collar that extends around the spar and engages directly with an interior side of the airfoil formed by the turbine vane so that forces applied to the turbine vane are carried by the case mount to the turbine case during use of the turbine assembly in the gas turbine engine.

8. A turbine assembly adapted for use in a gas turbine engine with a turbine vane comprising ceramic matrix composite materials configured to redirect air moving through a primary gas path of the gas turbine engine, the assembly comprising:

a turbine case arranged around a central reference axis, a vane stage including (a) the turbine vane comprising ceramic matrix composite materials shaped to form an airfoil that extends across the primary gas path of the gas turbine engine and (b) an inner vane seal land located radially inward of the turbine vane, the inner vane seal land configured to be engaged by a rotating component to create seal separating pressure zones within the gas turbine engine when the turbine assembly is used in the gas turbine engine, and a vane-stage support comprising metallic materials that is configured to hold the turbine vane and the inner vane seal land in place relative to the turbine case, the vane-stage support including (1) a case mount that extends radially through the case and (2) a spar that extends from the case mount radially through the airfoil of the turbine vane to the inner vane seal land, wherein the turbine vane and the inner vane seal land are coupled to the spar so that forces applied to the vane stage are carried by the spar to the case mount and case during use of the turbine assembly in the gas turbine engine, wherein the case mount includes a coupling flange that extends along a radially-outwardly facing surface of the case, wherein the coupling flange includes a spar fixture that extends radially-inwardly from the coupling flange through a mount aperture formed in the case, and the spar is coupled to the spar fixture inside the case, wherein the spar fixture of the vane-stage support is engaged directly by the turbine vane of the vane stage so that forces applied to the turbine vane are carried by the case mount to the case during use of the turbine assembly in the gas turbine engine, and wherein the spar fixture includes an outer load transfer collar that extends around the spar and engages directly with an interior side of the airfoil formed by the turbine vane so that forces applied to the turbine vane are carried by the case mount to the case during use of the turbine assembly in the gas turbine engine.

9. A turbine assembly, the assembly comprising:

a turbine case arranged around a central reference axis, a turbine vane comprising ceramic matrix composite materials shaped to form an airfoil, an inner vane seal land located radially inward of the turbine vane, and a vane-stage support configured to hold the turbine vane and the inner vane seal land in place relative to the turbine case, the vane-stage support including a case mount that extends radially through the turbine case and a spar that extends from the case mount radially through the airfoil of the turbine vane to the inner vane seal land, wherein the inner vane seal land is coupled to the spar so that forces applied to the inner vane seal land are carried by the spar to the case mount and the turbine case, wherein the case mount includes a coupling flange engaged with the turbine case and a spar fixture that extends radially through a mount aperture in the turbine case to the spar, and wherein the spar fixture includes an outer load transfer collar that extends around the spar and engages one of an exterior side or an interior side of the airfoil formed by the turbine vane so that forces applied to the turbine vane are carried by the case mount to the turbine case.

10. The assembly of claim 9, wherein the inner vane seal land is fixed to the spar at a location radially inward of the turbine vane.

11. The assembly of claim 9, wherein the coupling flange of the case mount extends in direct confronting relation along a radially-outwardly facing surface of the turbine case.

12. The assembly of claim 11, wherein the vane-stage support includes threaded flange fasteners located axially forward and aft of the mount aperture that extend through the coupling flange to fix the case mount to the turbine case.

13. The assembly of claim 9, wherein the spar fixture defines a radially-inwardly opening spar-receiver space inside the turbine case and the spar is arranged in part within the spar-receiver space.

14. The assembly of claim 9, wherein the spar fixture includes at least two retainer legs that extend around the spar and clamp onto the spar to couple the spar to the case mount.

15. The assembly of claim 14, wherein the case mount includes a threaded fixture fastener that applies a clamp load onto the at least two retainer legs of the spar fixture to clamp the spar therebetween.

16. The assembly of claim 9, wherein the spar includes a rod and an inner load transfer collar, the rod is received in part in the spar fixture to couple the spar to the case mount and extends from the spar fixture through the airfoil of the turbine vane to the inner vane seal land, and the inner load transfer collar extends axially forward and aft from the rod to directly engage the turbine vane at a radially-inner end of the vane.

17. The assembly of claim 16, wherein the spar fixture of the vane-stage support is engaged directly by the turbine vane at a radially-outer end of the vane.

18. The assembly of claim 9, wherein the outer load transfer collar engages directly with the interior side of the airfoil formed by the turbine vane.

* * * * *